United States Patent
Hori (10) Patent No.: US 11,940,393 B2
(45) Date of Patent: Mar. 26, 2024

(54) X-RAY INSPECTION APPARATUS

(71) Applicant: Ishida Co., Ltd., Kyoto (JP)

(72) Inventor: Hiroshi Hori, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 48 days.

(21) Appl. No.: 17/655,095

(22) Filed: Mar. 16, 2022

(65) Prior Publication Data

US 2022/0299452 A1    Sep. 22, 2022

(30) Foreign Application Priority Data

Mar. 19, 2021    (JP) .................................. 2021-045659

(51) Int. Cl.
*G01N 23/04*    (2018.01)
*G01V 5/00*    (2006.01)
*G21F 3/00*    (2006.01)

(52) U.S. Cl.
CPC .............. *G01N 23/04* (2013.01); *G01V 5/20* (2024.01); *G21F 3/00* (2013.01); *G01N 2223/30* (2013.01); *G01N 2223/40* (2013.01)

(58) Field of Classification Search
None
See application file for complete search history.

(56) References Cited

U.S. PATENT DOCUMENTS

| | | | |
|---|---|---|---|
| 8,837,669 B2 * | 9/2014 | Morton | A61B 6/027 378/41 |
| 8,885,794 B2 * | 11/2014 | Morton | G01N 23/04 378/57 |
| 9,020,095 B2 * | 4/2015 | Morton | H05G 1/70 378/57 |
| 9,048,061 B2 * | 6/2015 | Morton | G01V 5/00 |
| 9,113,839 B2 * | 8/2015 | Morton | G01T 1/2985 |
| 9,138,835 B2 * | 9/2015 | Shiozawa | B23P 11/00 |
| 9,442,082 B2 * | 9/2016 | Morton | A61B 6/4028 |
| 9,618,648 B2 * | 4/2017 | Morton | A61B 6/4488 |
| 9,638,646 B2 * | 5/2017 | Morton | G01N 23/087 |
| 9,675,306 B2 * | 6/2017 | Morton | A61B 6/487 |

(Continued)

FOREIGN PATENT DOCUMENTS

JP    2003-107016 A    4/2003
JP    2003-185602 A    7/2003

(Continued)

OTHER PUBLICATIONS

Machine Translation of JP2009222662A (Year: 2009).*

(Continued)

*Primary Examiner* — David P Porta
*Assistant Examiner* — Djura Malevic
(74) *Attorney, Agent, or Firm* — Studebaker & Brackett PC (57) ABSTRACT

An X-ray inspection apparatus includes: an X-ray irradiation unit; a transport unit; an X-ray detection unit; and an X-ray shielding door. An inclined portion that is inclined downward from the one side toward the other side in the width direction when seen in the transport direction in the closed state is formed in at least a part of an inner surface of the X-ray shielding door. In the closed state, a lower end portion of the inclined portion in the vertical direction is located closer to the other side of the width direction than a position of an end portion of the transport unit on the one side of the width direction.

21 Claims, 6 Drawing Sheets

(56) References Cited

U.S. PATENT DOCUMENTS

| | | | | |
|---|---|---|---|---|
| 10,175,381 B2* | 1/2019 | Morton | ................ | A61B 6/4488 |
| 10,295,483 B2* | 5/2019 | Morton | ................ | G01N 23/046 |
| 10,591,424 B2* | 3/2020 | Morton | .................. | H01J 35/04 |
| 10,790,067 B2* | 9/2020 | Omori | ..................... | G01N 23/18 |
| 10,901,112 B2* | 1/2021 | Morton | ................ | A61B 6/4014 |
| 10,976,271 B2* | 4/2021 | Morton | ..................... | G06T 7/12 |
| 2015/0338355 A1* | 11/2015 | Kim | ........................ | G01N 23/02 |
| | | | | 378/58 |
| 2018/0122526 A1* | 5/2018 | Omori | .................. | G01N 23/083 |
| 2022/0299452 A1* | 9/2022 | Hori | ........................ | G01N 23/04 |

FOREIGN PATENT DOCUMENTS

| | | | |
|---|---|---|---|
| JP | 2004-233206 A | | 8/2004 |
| JP | 2007-183201 A | | 7/2007 |
| JP | 2009222662 A | * | 10/2009 |
| JP | 2012078254 A | * | 4/2012 |
| JP | 2012078255 A | * | 4/2012 |

OTHER PUBLICATIONS

Machine Translation of 2004233206A (Year: 2004).*
Machine Translation of 2012078254A (Year: 2012).*
Machine Translation of 2012078255A (Year: 2012).*
The extended European search report issued by the European Patent Office dated Jul. 27, 2022, which corresponds to European Patent Application No. 22161763.2-1001 and is related to U.S. Appl. No. 17/655,095.

* cited by examiner

X-RAY INSPECTION APPARATUS

TECHNICAL FIELD

One aspect of the present disclosure relates to an X-ray inspection apparatus.

BACKGROUND

In a production line of products such as foods, for example, an inspection to inspect for foreign matter in packages of the products is carried out. In such an inspection, an X-ray inspection apparatus is used which irradiates products with X-rays and determines a state of the products based on the amount of transmission of X-rays using a line sensor or the like, the products being continuously transported in a state of being placed on a transport conveyor. Such an X-ray inspection apparatus is provided with an X-ray shielding unit (shielding box) that prevents X-rays from leaking from an X-ray irradiation space. In addition, an X-ray shielding door that allows access into the X-ray irradiation space from the outside of the X-ray shielding unit is provided in a part of the X-ray shielding unit. The X-ray shielding door can prevent the leakage of X-rays in a closed state, and allows a worker to perform maintenance work such as cleaning of each component in the X-ray irradiation space in an open state.

Patent Literature 1 (Japanese Unexamined Patent Publication No. 2007-183201) discloses an X-ray shielding door including a main body portion and side walls (protrusion portion) including an upper side wall portion, a left side wall portion, a right side wall portion, and a lower side wall portion that are bent to an X-ray irradiation space side with a periphery of the main body portion serving as a base end. The side walls effectively shield the leakage of X-rays from the X-ray irradiation space in a state where the X-ray shielding door is closed.

However, in the X-ray inspection apparatus of the related art, the lower side wall portion is configured to be inclined downward in a closed state, and water or dirt may adhere to and remain in the lower side wall portion as long as the lower side wall portion exists which can be a portion to support water or dirt from below.

SUMMARY

Therefore, an object of one aspect of the present disclosure is to provide an X-ray inspection apparatus capable of effectively preventing X-rays from leaking via an X-ray shielding door even when a protrusion portion is not provided at a lower end of the X-ray shielding door.

According to one aspect of the present disclosure, there is provided an X-ray inspection apparatus including: an X-ray irradiation unit configured to irradiate an article with an X-ray; a transport unit configured to transport the article in one direction such that the article passes through an irradiation space of the X-ray emitted from the X-ray irradiation unit; an X-ray detection unit configured to detect the X-ray transmitting through the article; and an X-ray shielding door disposed on one side of a width direction with respect to the transport unit to open the irradiation space to an outside in an open state and to prevent the X-ray from leaking from the irradiation space in a closed state, the width direction being orthogonal to both a transport direction of the article and a vertical direction. An inclined portion that is inclined downward from the one side toward the other side in the width direction when seen in the transport direction in the closed state is formed in at least a part of an inner surface of the X-ray shielding door. In the closed state, a lower end portion of the inclined portion in the vertical direction is located closer to the other side of the width direction than a position of an end portion of the transport unit on the one side of the width direction.

In the X-ray inspection apparatus having this configuration, the inclined portion that is flat is formed in at least a part of the inner surface of the X-ray shielding door. In a closed state, since the lower end portion of the inclined portion is located closer to the other side of the width direction than the position of the end portion of the transport unit on the one side of the width direction, the inclined portion is located on a path along which X-rays leak linearly from a gap between the transport unit and the inclined portion. Accordingly, even when the protrusion portion is not provided at a lower end of the X-ray shielding door, X-rays can be effectively prevented from leaking via the X-ray shielding door.

In the X-ray inspection apparatus according to one aspect of the present disclosure, an upper end portion of the inclined portion may be located above a transport surface of the transport unit. In this configuration, since the majority of the inner surface of the X-ray shielding door is formed flat, water can be effectively guided from above to below.

In the X-ray inspection apparatus according to one aspect of the present disclosure, the inclined portion may extend linearly from an upper end to a lower end in the inclined portion. In this configuration, water can be effectively guided from above to below on the inner surface of the X-ray shielding door.

In the X-ray inspection apparatus according to one aspect of the present disclosure, a protrusion portion may be formed in the X-ray shielding door, the protrusion portion protruding from a part of a peripheral end of the inner surface of the X-ray shielding door to the other side of the width direction with the peripheral end serving as a base end. An inclined lower end portion coinciding with the lower end portion of the inclined portion may be formed at a part of a lower end of the inner surface of the X-ray shielding door, which is included in the part of the peripheral end. The protrusion portion inclined along the transport direction may be provided at the lower end of the inner surface of the X-ray shielding door excluding the inclined lower end portion. In this configuration, since the protrusion portion is provided, X-rays can be more reliably prevented from leaking from the irradiation space. In addition, even when the protrusion portion is provided at the lower end of the inner surface of the X-ray shielding door, since the protrusion portion is inclined, water or dirt can be prevented from adhering to and remaining in the X-ray shielding door. As a result, it is possible to prevent water or dirt from adhering to a part of the X-ray shielding door while helping pinpointing a location where the leakage of X-rays is desired to be reliably prevented.

In the X-ray inspection apparatus according to one aspect of the present disclosure, the protrusion portion may be provided to interpose the inclined lower end portion in the transport direction, and the protrusion portion may be inclined downward toward the inclined lower end portion in the transport direction. In this configuration, it is possible to prevent water or dirt from adhering to a part of the X-ray shielding door while helping pinpointing a location where the leakage of X-rays is desired to be reliably prevented.

The X-ray inspection apparatus according to one aspect of the present disclosure may further includes a support portion configured to support the X-ray detection unit, and the protrusion portion may be provided such that a part of the protrusion portion is located vertically below the support portion when seen in the width direction. In this configuration, the protrusion portion is not disposed in a region where the support portion that shields X-rays in the transport direction is disposed, so that a function of allowing water to flow downward can be exhibited at its maximum, and a function of shielding X-rays in a region where the support portion is not disposed can be exhibited. Accordingly, it is possible to prevent X-rays from leaking via the X-ray shielding door while preventing the adhering of water or dirt.

According to one aspect of the present disclosure, even when the protrusion portion is not provided at the lower end of the X-ray shielding door, X-rays can be effectively prevented from leaking via the X-ray shielding door.

DETAILED DESCRIPTION

Hereinafter, an X-ray inspection apparatus 1 that is one exemplary embodiment of one aspect of the present disclosure will be described with reference to the drawings. Incidentally, in the description of the drawings, the same elements are denoted by the same reference signs, and a duplicated description will be omitted. Hereinafter, for convenience of description, an X-axis direction, a Y-axis direction, and a Z-axis direction that are orthogonal to each other are set in FIGS. 1 to 6. The X-axis direction is a direction parallel to a transport direction X of an article A transported by a transport unit 5, the Y-axis direction is a width direction Y orthogonal to the transport direction X on a transport surface of the article A, and the Z-axis direction is a vertical direction Z orthogonal to both the transport direction X and the width direction Y.

Figure 1:
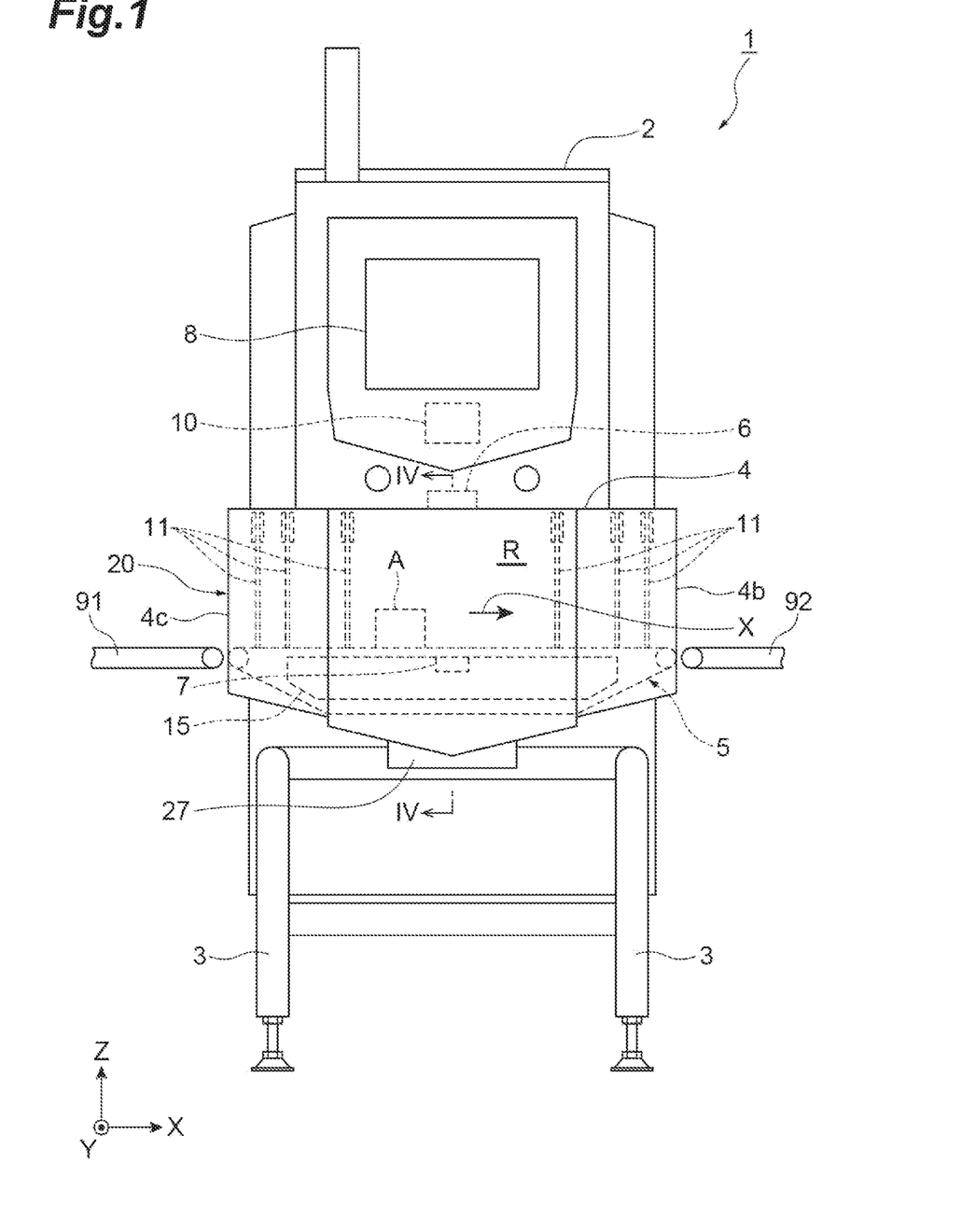
FIG. 1 is a configuration view of an X-ray inspection apparatus according to one embodiment.
Figure 2:
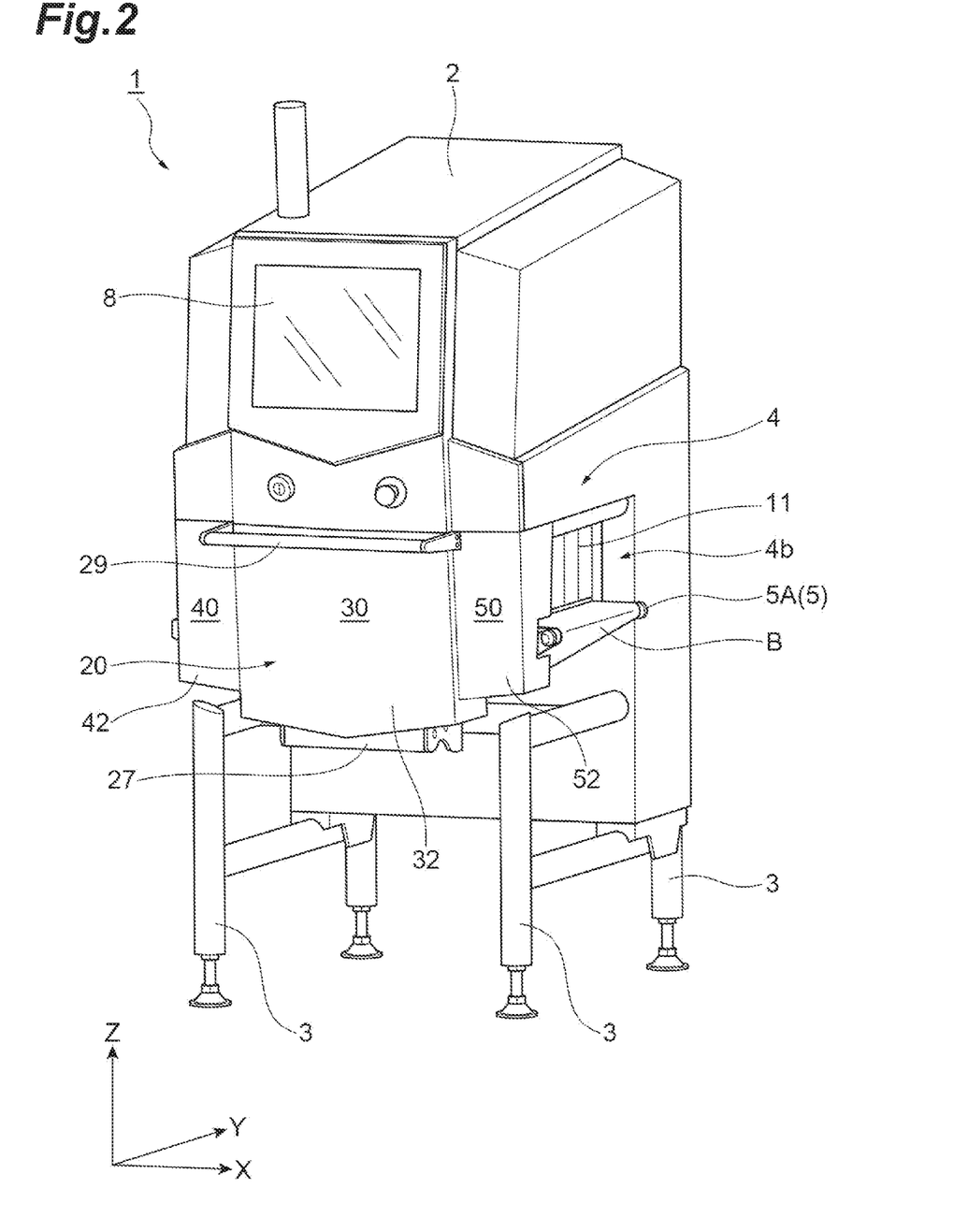
FIG. 2 is a perspective view of the X-ray inspection apparatus according to one embodiment.

As shown in FIGS. 1 and 2, the X-ray inspection apparatus 1 includes an apparatus main body 2, support legs 3, a shielding box 4, the transport unit 5, an X-ray irradiation unit 6, an X-ray detection unit 7, a display operation unit 8, and a control unit 10. The X-ray inspection apparatus 1 acquires an X-ray transmission image of the article A while transporting the article A, and performs an inspection (for example, a number-of-packaged items inspection, a foreign matter inspection, a defective product inspection, a crack inspection, or the like) on the article A based on the X-ray transmission image.

Incidentally, the article A before inspection is carried in to the X-ray inspection apparatus 1 by a carry-in conveyor 91, and the article A after inspection is carried out from the X-ray inspection apparatus 1 by a carry-out conveyor 92. The article A that is determined to be a defective product by the X-ray inspection apparatus 1 is sorted out of a production line by a sorting apparatus (not shown) disposed downstream of the carry-out conveyor 92, and the article A that is determined to be a non-defective product by the X-ray inspection apparatus 1 passes through the sorting apparatus as it is.

The apparatus main body 2 accommodates the control unit 10 and the like. The support legs 3 support the apparatus main body 2. The shielding box 4 is provided in the apparatus main body 2, and prevents X-rays from leaking from an irradiation space R of X-rays to be emitted from the X-ray irradiation unit 6. A carry-in port 4a and a carry-out 4b are formed in the shielding box 4. In addition, an X-ray shielding door 20 is provided in the shielding box 4 on one side of the width direction Y orthogonal to both the transport direction X of the article A and the vertical direction Z (on a front side that is a side on which a worker operates the X-ray inspection apparatus 1). The X-ray shielding door 20 is provided to open the irradiation space R to the outside in an open state of the X-ray shielding door 20, and to prevent X-rays from leaking from the irradiation space R in a closed state. The X-ray shielding door 20 will be described in detail at a later stage.

The article A before inspection is carried in to the shielding box 4 from the carry-in conveyor 91 via the carry-in port 4a, and the article A after inspection is carried out to the carry-out conveyor 92 from the shielding box 4 via the carry-out 4b. Each of the carry-in port 4a and the carry-out 4h is provided with an X-ray shielding curtain 11 that prevents the leakage of X-rays.

The transport unit 5 is disposed inside the shielding box 4, and transports the article A from the carry-in port 4a to the carry-out 4b such that the article A passes through the irradiation space R of X-rays. The transport unit 5 includes a transport conveyor 5A and a conveyor support portion 5B. For example, the transport conveyor 5A rotates a belt B suspended between the carry-in port 4a and the carry-out 4b, in the transport direction to transport the article A placed on the belt B. The conveyor support portion 5B is a member that supports the transport conveyor 5A and the X-ray detection unit 7 to be described at a later stage, and is supported in a cantilever manner by the apparatus main body 2.

The X-ray irradiation unit 6 is disposed inside the shielding box 4, and irradiates the article A with X-rays, the article A being transported by the transport conveyor 5A. The X-ray irradiation unit 6 includes, for example, an X-ray tube that emits X-rays and a collimator that spreads the X-rays emitted from the X-ray tube, in a fan shape in a plane perpendicular to the transport direction X.

The X-ray detection unit 7 is disposed inside the shielding box 4, and detects X-rays transmitting through the article A and through the belt B. The X-ray detection unit 7 is configured as, for example, a line sensor. Specifically, the X-ray detection unit 7 includes a plurality of photodiodes arranged one-dimensionally along a horizontal direction perpendicular to the transport direction X, and a scintillator disposed on an X-ray incident side with respect to each of the photodiodes. In this case, in the X-ray detection unit 7, X-rays incident on the scintillator are converted into light, and light incident on each of the photodiodes is converted into an electric signal. The X-ray detection unit 7 is supported by the conveyor support portion 5B.

The display operation unit 8 is provided in the apparatus main body 2 to display various information and to receive an input of various conditions. The display operation unit 8 is, for example, a liquid crystal display, and displays an operation screen that is a touch panel. In this case, an operator can input various conditions via the display operation unit 8.

The control unit 10 is disposed inside the apparatus main body 2, and controls operation of each part of the X-ray inspection apparatus 1. The control unit 10 includes a central processing unit (CPU), a read only memory (ROM), a random access memory (RAM), and the like. A signal that is output from the X-ray detection unit 7 and is A/D converted is input to the control unit 10. The control unit 10 functions as an inspection unit that generates an X-ray transmission image of the article A based on the signal and that performs an inspection on the article A based on the X-ray transmission image.

Figure 3:
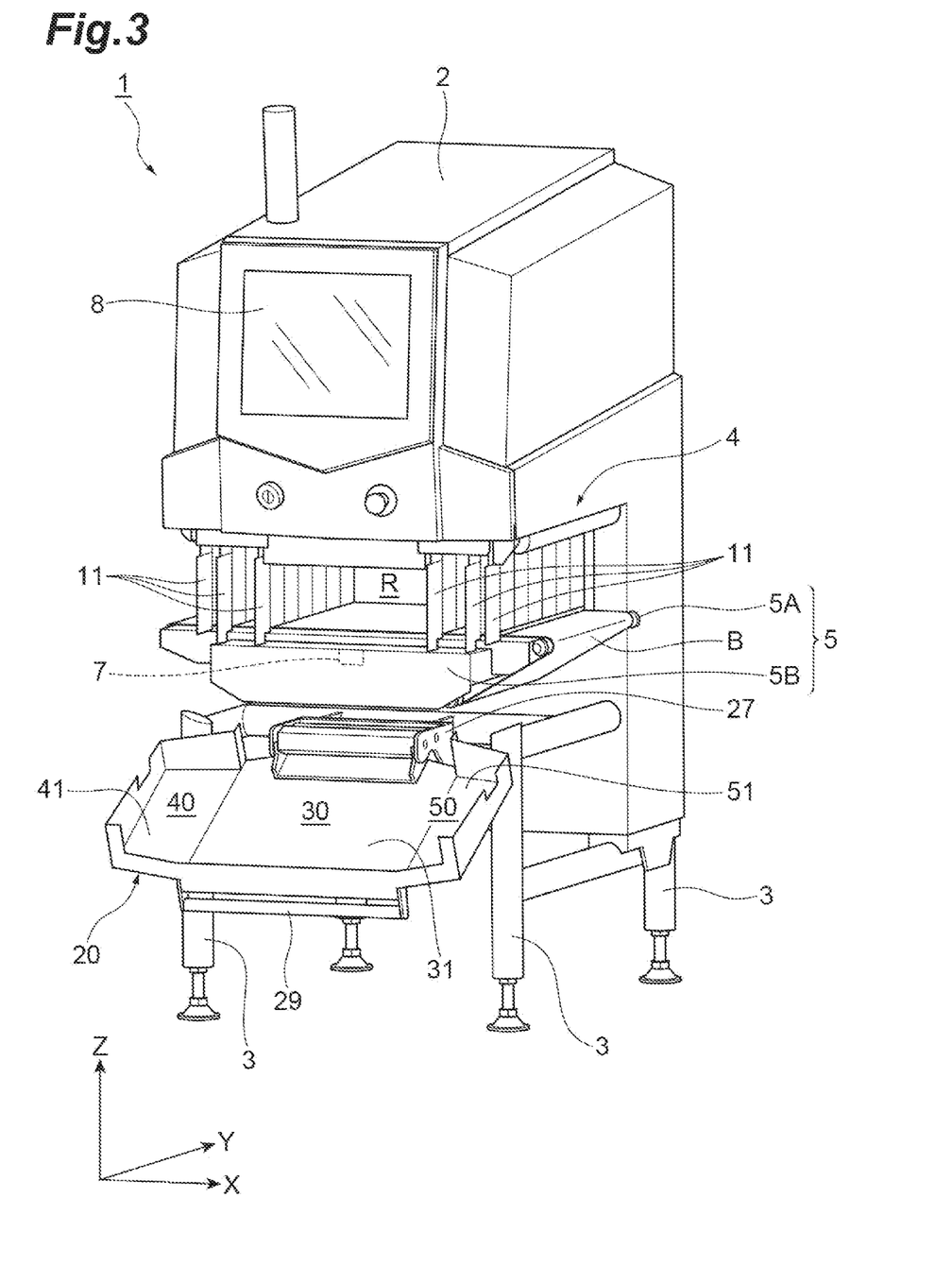
FIG. 3 is a perspective view when an X-ray shielding door is in an open state.
Figure 5:
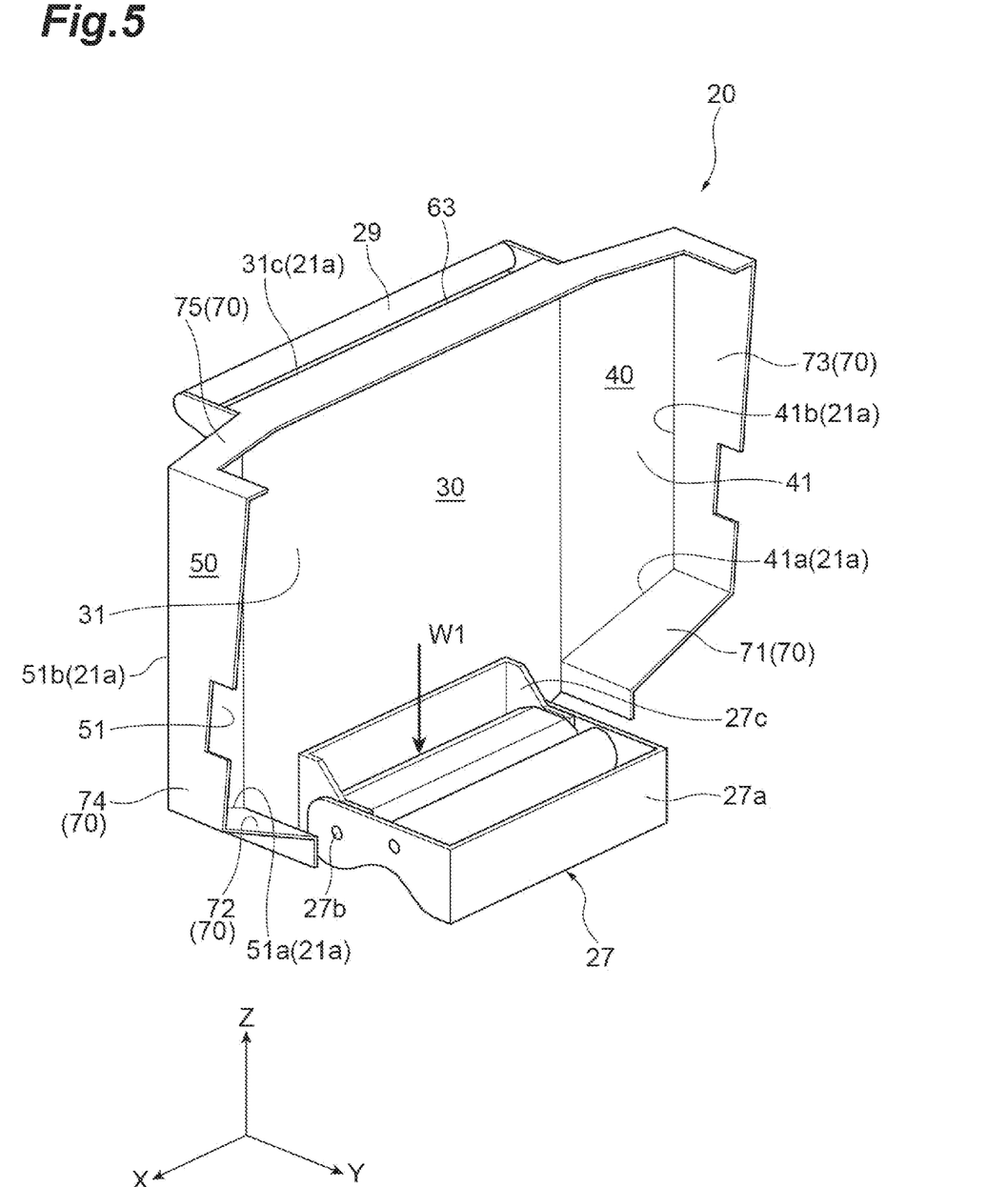
FIG. 5 is a perspective view of the X-ray shielding door of the X-ray inspection apparatus of FIG. 1.

Hereinafter, the X-ray shielding door 20 will be described in detail. As shown in FIGS. 2 and 3, the X-ray shielding door 20 is disposed on the one side of the width direction Y with respect to the transport conveyor 5A, to open the irradiation space R to the outside in an open state (refer to FIG. 3) and to prevent X-rays from leaking from the irradiation space R in a closed state (refer to FIG. 2). The X-ray shielding door 20 is fixed to the support legs 3 via a hinge portion 27. As shown in FIG. 5, the hinge portion 27 includes a first frame portion 27a, a rotating shaft 27b, and a second frame portion 27c, The first frame portion 27a is fixed to the support legs 3. The second frame portion 27c is provided to be rotatable around the rotating shaft 27b extending in the X-axis direction, with respect to the first frame portion 27a, The second frame portion 27c is fixed to the X-ray shielding door 20. The X-ray shielding door 20 rotates around the hinge portion 27 to be switchable between an open state and a closed state. The X-ray shielding door 20 is provided with a handle 29 to be operated by a worker.

Figure 4:
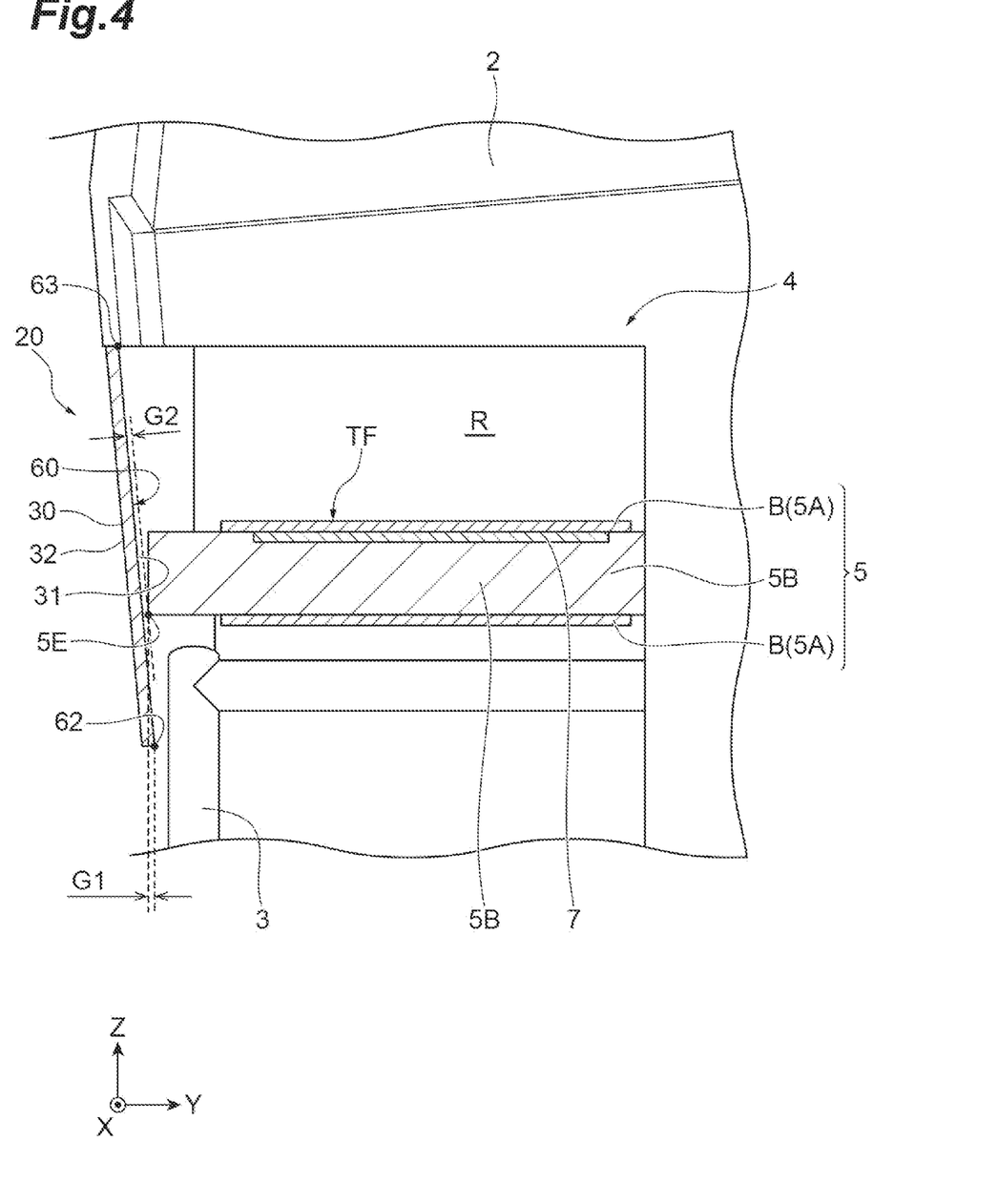
FIG. 4 is a cross-sectional view taken along line IV-IV when the X-ray shielding door is in a closed state in FIG. 1.
Figure 6:
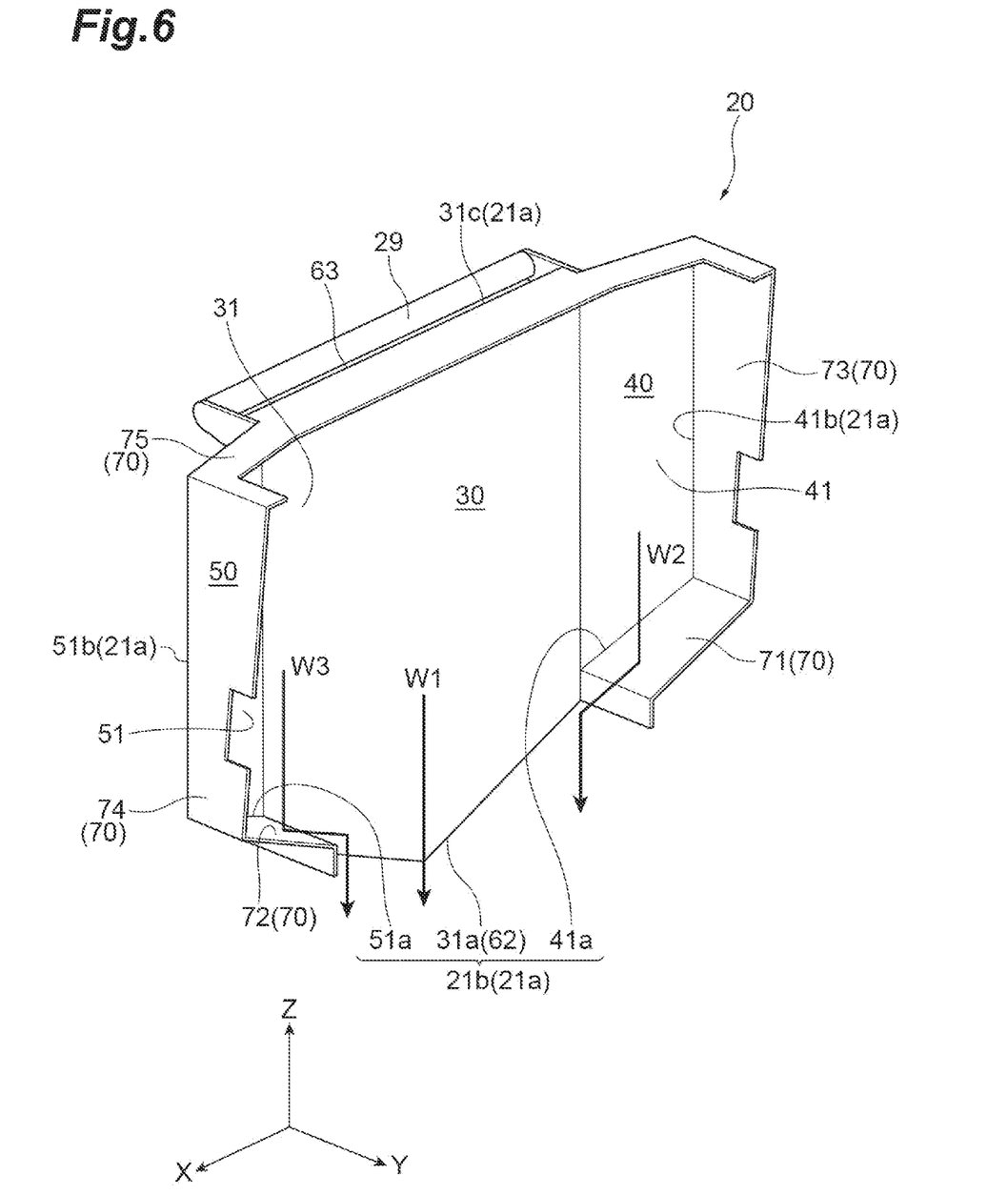
FIG. 6 is a perspective view in a state where a hinge portion is removed from the X-ray shielding door of FIG. 5.

As shown in FIGS. 4 to 6, the X-ray shielding door 20 has an inner surface 21 and an outer surface 22. In addition, the X-ray shielding door 20 includes a front portion 30, a left front portion 40, and a right front portion 50. The front portion 30 has an inner surface 31 and an outer surface 32. As shown in FIG. 4, an inclined portion 60 (hatched portion in FIGS. 3, 5, and 6) that is flat and linearly inclined downward from the one side of the width direction Y (left side of the drawing sheet of FIG. 4) toward the other side (right side of the drawing sheet of FIG. 4) when seen in the transport direction X in a closed state is formed in the inner surface 31. The inclined portion 60 is formed in a planar shape when seen in the width direction Y.

An inclined lower end portion 62 that is a lower end portion of the inclined portion 60 is lengthened and is located on the other side of the width direction Y (right side of the drawing sheet of FIG. 4) at a distance G1 (for example, 0 mm to 10 mm) from the position of an end portion 5E of the transport unit 5 on the one side of the width direction Y (left side of the drawing sheet of FIG. 4). In other words, in a plan view seen in the vertical direction Z, the inclined lower end portion 62 is located below the position of the end portion 5E of the transport unit 5, and is lengthened and entered the distance G1 (for example, 0 mm to 10 mm) below the transport unit 5. Incidentally, the fact that the distance G1 is 0 mm means that the inclined lower end portion 62 is located directly below the end portion 5E. The inclined lower end portion 62 extends to be inclined downward toward a direction of the center of the front portion 30 along the X-axis direction, and is located closer to the other side of the width direction Y (right side of the drawing sheet of FIG. 4) in an extending direction as a whole than the position of the end portion 5E of the transport unit 5. The X-ray shielding door 20 is provided such that a distance G2 between the inclined portion 60 and the conveyor support portion 5B in the width direction Y is minimized. An inclined upper end portion 63 that is an upper end of the inclined portion 60 is located above a transport surface TF (namely, the belt B on which the article A is placed) of the transport unit 5.

The left front portion 40 has an inner surface 41 and an outer surface 42, and the right front portion 50 has an inner surface 51 and an outer surface 52. The left front portion 40 and the right front portion 50 are provided to interpose the front portion 30 therebetween in the transport direction X. A protrusion portion 70 protruding to the other side of the width direction Y with the peripheral end 21a serving as a base end is provided at a part of a peripheral end 21a of the inner surface 21 (region in which the inner surface 31 of the front portion 30, the inner surface 41 of the left front portion 40, and the inner surface 51 of the right front portion 50 are combined) of the X-ray shielding door 20.

The protrusion portion 70 includes a first protrusion portion 71 protruding from a lower end 41a of the inner surface 41 of the left front portion 40, a second protrusion portion 72 protruding from a lower end 51a of the inner surface 51 of the right front portion 50, a third protrusion portion 73 protruding from a side end 41b of the inner surface 41 of the left front portion 40, a fourth protrusion portion 74 protruding from a side end 51b of the inner surface 51 of the right front portion 50, and a fifth protrusion portion 75 protruding from an upper end 31c of the inner surface 31 of the front portion 30, from an upper end 41c of the inner surface 41 of the left front portion 40, and from an upper end 51c of the inner surface 51 of the right front portion 50. The protrusion portion 70 of the present embodiment may be formed by bending a material from peripheral ends of the front portion 30, of the left front portion 40, and of the right front portion 50 using, for example, pressing or the like, or may be formed by connecting separate members using welding or the like.

As shown in FIG. 6, the first protrusion portion 71 is inclined downward toward the front portion 30 in the transport direction X. In a closed state, a tip of the first protrusion portion 71 is located below the transport unit 5. The second protrusion portion 72 is inclined downward toward the front portion 30 in the transport direction X. In a closed state, a tip of the second protrusion portion 72 is located below the transport unit 5, The protrusion portion 70 does not exist between the first protrusion portion 71 and the second protrusion portion 72 in the transport direction X. A lower end 21b included in the peripheral end 21a of the X-ray shielding door 20 of the present embodiment is formed of a lower end 31a of the inner surface 31 of the front portion 30, the lower end 41a of the inner surface 41 of the left front portion 40, and the lower end 51a of the inner surface 51 of the right front portion 50, and the protrusion portion 70 is not formed at the inclined lower end portion 62 that is the lower end 31a of the inner surface 31 of the front portion 30 in the vertical direction. The first protrusion portion 71 and the second protrusion portion 72 are provided such that a part thereof is located below the conveyor support portion 5B in the vertical direction Z when seen in the width direction Y.

Next, actions and effects of the X-ray inspection apparatus 1 of the present embodiment will be described. In the X-ray inspection apparatus 1 of the embodiment, the inclined portion 60 that is flat is formed in at least a part of the inner surface 21 of the X-ray shielding door 20. In a closed state, since the inclined lower end portion 62 of the inclined portion 60 is located closer to the other side of the width direction Y than the position of the end portion 5E of the transport unit 5 on the one side of the width direction Y, the inclined portion 60 is located on a path along which X-rays leak linearly from a gap between the transport unit 5 and the inclined portion 60. Accordingly, even when the protrusion portion is not provided at the lower end 21b of the X-ray shielding door 20, X-rays can be effectively prevented from leaking via the X-ray shielding door 20.

In addition, since the inclined portion 60 is formed flat from the inclined upper end portion 63 to the inclined lower end portion 62, as indicated by an arrow W1 in FIGS. 5 and 6, even when water is used during cleaning, the water is smoothly guided from above toward below. Accordingly, water or dirt can be prevented from adhering to and remaining in the X-ray shielding door 20. Incidentally, in FIG. 5, the hinge portion 27 is disposed, but a gap that is sufficient to allow water to flow is formed between the rotating shaft 27b of the hinge portion 27 and the inner surface 31 of the front portion 30 to which the hinge portion 27 is attached.

In the X-ray inspection apparatus according to one aspect of the present disclosure, the upper end portion of the inclined portion 60 may be located above the transport surface of the transport unit. In this configuration, since the majority of the inner surface of the X-ray shielding door is formed flat, water can be effectively guided from above to below.

Since the inclined portion 60 in the X-ray inspection apparatus 1 of the present embodiment extends linearly from the inclined upper end portion 63 to the inclined lower end portion 62, water can be effectively guided from above to below on the inner surface 21 of the X-ray shielding door 20.

Since the X-ray shielding door 20 of the X-ray inspection apparatus 1 of the embodiment is provided with the first protrusion portion 71, the second protrusion portion 72, the third protrusion portion 73, the fourth protrusion portion 74, and the fifth protrusion portion 75, X-rays can be more reliably prevented from leaking from the irradiation space R. In addition, even in a case where the first protrusion portion 71 and the second protrusion portion 72 are provided at the lower end 21b of the inner surface 21 of the X-ray shielding door 20, since the first protrusion portion 71 and the second protrusion portion 72 are inclined, as indicated by arrows W2 and W3 in FIGS. 5 and 6, even when water is used during cleaning, the water is smoothly guided from above toward below. Accordingly, water or dirt can be prevented from adhering to and remaining in the X-ray shielding door 20. As a result, it is possible to prevent water or dirt from adhering to a part of the X-ray shielding door 20 while reliably preventing the leakage of X-rays.

In the X-ray inspection apparatus 1 of the embodiment, the first protrusion portion 71 and the second protrusion portion 72 are provided to interpose the inclined lower end portion 62 therebetween in the transport direction X, and the first protrusion portion 71 and the second protrusion portion 72 are inclined downward toward the inclined lower end portion 62 in the transport direction X. It is possible to prevent water or dirt from adhering to a part of the X-ray shielding door 20 while reliably preventing the leakage of X-rays.

In the X-ray inspection apparatus 1 of the embodiment, the first protrusion portion 71 and the second protrusion portion 72 are provided such that a part thereof is located vertically below the conveyor support portion 5B when seen in the width direction Y. In this configuration, the conveyor support portion 5B that shields X-rays in the transport direction X is disposed, and the protrusion portion 70 protruding in the width direction is not disposed in a region where X-rays are unlikely to leak downward, so that a function of allowing water to flow downward can be exhibited at its maximum, and a function of shielding X-rays in a region where the conveyor support portion 5B is not disposed can be exhibited. Accordingly, it is possible to prevent X-rays from leaking via the X-ray shielding door 20 while preventing the adhering of water or dirt.

One embodiment has been described above; however, one aspect of the present disclosure is not limited to the embodiment, and various changes can be made without departing from the concept of one aspect of the present disclosure.

In the X-ray inspection apparatus 1 of the embodiment, the X-ray shielding door 20 including the left front portion 40, the right front portion 50, and the inner surfaces of the left front portion 40 and of the right front portion 50 has been described as an example; however, the present disclosure is not limited to the configuration. For example, the X-ray inspection apparatus 1 may include only the front portion 30 and the inner surface 31 of the front portion 30, and the entirety of the inner surface 31 is formed of the inclined portion 60.

An example has been described in which the X-ray inspection apparatus 1 of the embodiment is provided with the first protrusion portion 71, the second protrusion portion 72, the third protrusion portion 73, the fourth protrusion portion 74, and the fifth protrusion portion 75; however, these protrusion portions may not be provided or may be selectively provided. In addition, the protrusion portion 70 may be provided at a part of the peripheral end 21a of the X-ray shielding door 20 that is different from those in the embodiment and in the modification example; however, even in this case, the protrusion portion 70 is provided at a portion other than the inclined lower end portion 62.

In the X-ray inspection apparatus 1 according to the embodiment and the modification example, an example where the inclined lower end portion 62 and the lower end 21b of the inner surface 21 of the X-ray shielding door 20 coincide with each other, namely, an example where a member extending downward from the inclined lower end portion 62 is not disposed has been described; however, the present disclosure is not limited to the configuration. For example, a portion may exist which extends downward from the inclined lower end portion 62 along the vertical direction, or a portion may exist which is bent at an obtuse angle from the inclined lower end portion 62 to one side of the width direction Y (front side).

What is claimed is:
1. An X-ray inspection apparatus comprising:
an X-ray tube configured to irradiate an article with an X-ray;
a transport conveyor configured to transport the article in one direction such that the article passes through an irradiation space of the X-ray emitted from the X-ray tube;
an X-ray sensor configured to detect the X-ray transmitting through the article; and
an X-ray shielding door disposed on one side of a width direction with respect to the transport conveyor to open the irradiation space to an outside in an open state and to prevent the X-ray from leaking from the irradiation space in a closed state, the width direction being orthogonal to both a transport direction of the article and a vertical direction,
wherein at least a part of an inner surface of the X-ray shielding door includes an inclined portion that is inclined downward from the one side toward an other side in the width direction with respect to the transport conveyor when seen in the transport direction in the closed state, and in the closed state, a lower end portion of the inclined portion in the vertical direction is located closer to the other side of the width direction than a position of an end portion of the transport conveyor on the one side of the width direction.

2. The X-ray inspection apparatus according to claim 1, wherein an upper end portion of the inclined portion is located above a transport surface of the transport conveyor.

3. The X-ray inspection apparatus according to claim 2, wherein the inclined portion extends linearly from an upper end to a lower end in the inclined portion.

4. The X-ray inspection apparatus according to claim 3, wherein a protrusion portion is formed in the X-ray shielding door, the protrusion portion protruding from a part of a peripheral end of the inner surface of the X-ray shielding door to the other side of the width direction with the peripheral end serving as a base end,
an inclined lower end portion coinciding with the lower end portion of the inclined portion is formed at a part of a lower end of the inner surface of the X-ray shielding door, which is included in the part of the peripheral end, and
the protrusion portion inclined along the transport direction is provided at the lower end of the inner surface of the X-ray shielding door excluding the inclined lower end portion.

5. The X-ray inspection apparatus according to claim 4, wherein the protrusion portion is provided to interpose the inclined lower end portion in the transport direction, and
the protrusion portion is inclined downward toward the inclined lower end portion in the transport direction.

6. The X-ray inspection apparatus according to claim 5, further comprising:
a support portion configured to support the X-ray sensor, wherein the protrusion portion is provided such that a part of the protrusion portion is located vertically below the support portion when seen in the width direction.

7. The X-ray inspection apparatus according to claim 4, further comprising:
a support portion configured to support the X-ray sensor, wherein the protrusion portion is provided such that a part of the protrusion portion is located vertically below the support portion when seen in the width direction.

8. The X-ray inspection apparatus according to claim 2, wherein a protrusion portion is formed in the X-ray shielding door, the protrusion portion protruding from a part of a peripheral end of the inner surface of the X-ray shielding door to the other side of the width direction with the peripheral end serving as a base end,
an inclined lower end portion coinciding with the lower end portion of the inclined portion is formed at a part of a lower end of the inner surface of the X-ray shielding door, which is included in the part of the peripheral end, and
the protrusion portion inclined along the transport direction is provided at the lower end of the inner surface of the X-ray shielding door excluding the inclined lower end portion.

9. The X-ray inspection apparatus according to claim 8, wherein the protrusion portion is provided to interpose the inclined lower end portion in the transport direction, and
the protrusion portion is inclined downward toward the inclined lower end portion in the transport direction.

10. The X-ray inspection apparatus according to claim 9, further comprising:
a support portion configured to support the X-ray sensor, wherein the protrusion portion is provided such that a part of the protrusion portion is located vertically below the support portion when seen in the width direction.

11. The X-ray inspection apparatus according to claim 8, further comprising:
a support portion configured to support the X-ray sensor, wherein the protrusion portion is provided such that a part of the protrusion portion is located vertically below the support portion when seen in the width direction.

12. The X-ray inspection apparatus according to claim 1, wherein the inclined portion extends linearly from an upper end to a lower end in the inclined portion.

13. The X-ray inspection apparatus according to claim 12, wherein a protrusion portion is formed in the X-ray shielding door, the protrusion portion protruding from a part of a peripheral end of the inner surface of the X-ray shielding door to the other side of the width direction with the peripheral end serving as a base end,
an inclined lower end portion coinciding with the lower end portion of the inclined portion is formed at a part of a lower end of the inner surface of the X-ray shielding door, which is included in the part of the peripheral end, and
the protrusion portion inclined along the transport direction is provided at the lower end of the inner surface of the X-ray shielding door excluding the inclined lower end portion.

14. The X-ray inspection apparatus according to claim 13, wherein the protrusion portion is provided to interpose the inclined lower end portion in the transport direction, and
the protrusion portion is inclined downward toward the inclined lower end portion in the transport direction.

15. The X-ray inspection apparatus according to claim 14, further comprising:
a support portion configured to support the X-ray sensor, wherein the protrusion portion is provided such that a part of the protrusion portion is located vertically below the support portion when seen in the width direction.

16. The X-ray inspection apparatus according to claim 13, further comprising:
a support portion configured to support the X-ray sensor, wherein the protrusion portion is provided such that a part of the protrusion portion is located vertically below the support portion when seen in the width direction.

17. The X-ray inspection apparatus according to claim 1, wherein a protrusion portion is formed in the X-ray shielding door, the protrusion portion protruding from a part of a peripheral end of the inner surface of the X-ray shielding door to the other side of the width direction with the peripheral end serving as a base end,
an inclined lower end portion coinciding with the lower end portion of the inclined portion is formed at a part of a lower end of the inner surface of the X-ray shielding door, which is included in the part of the peripheral end, and
the protrusion portion inclined along the transport direction is provided at the lower end of the inner surface of the X-ray shielding door excluding the inclined lower end portion.

18. The X-ray inspection apparatus according to claim 17, wherein the protrusion portion is provided to interpose the inclined lower end portion in the transport direction, and the protrusion portion is inclined downward toward the inclined lower end portion in the transport direction.

19. The X-ray inspection apparatus according to claim 18, further comprising:
a support portion configured to support the X-ray sensor,
wherein the protrusion portion is provided such that a part of the protrusion portion is located vertically below the support portion when seen in the width direction.

20. The X-ray inspection apparatus according to claim 17, further comprising:
a support portion configured to support the X-ray sensor,
wherein the protrusion portion is provided such that a part of the protrusion portion is located vertically below the support portion when seen in the width direction.

21. An X-ray inspection apparatus comprising:
an X-ray irradiation unit configured to irradiate an article with an X-ray;
a transport unit configured to transport the article in one direction such that the article passes through an irradiation space of the X-ray emitted from the X-ray irradiation unit;
an X-ray detection unit configured to detect the X-ray transmitting through the article; and
an X-ray shielding door disposed on one side of a width direction with respect to the transport unit to open the irradiation space to an outside in an open state and to prevent the X-ray from leaking from the irradiation space in a closed state, the width direction being orthogonal to both a transport direction of the article and a vertical direction,
wherein an inclined portion that is inclined downward from the one side toward the other side in the width direction when seen in the transport direction in the closed state is formed in at least a part of an inner surface of the X-ray shielding door, and
in the closed state, a lower end portion of the inclined portion in the vertical direction is located closer to the other side of the width direction than a position of an end portion of the transport unit on the one side of the width direction.

* * * * *